United States Patent [19]
Brown

[11] Patent Number: 5,852,824
[45] Date of Patent: Dec. 22, 1998

[54] APPARATUS AND METHOD FOR PROCESSING YEAR-DATE DATA IN COMPUTER SYSTEMS

[76] Inventor: Roger W. Brown, 8521 E. McDowell Rd., Apt. #142, Scottsdale, Ariz. 85257

[21] Appl. No.: 861,557

[22] Filed: May 22, 1997

[51] Int. Cl.⁶ .................................................. G06F 17/30
[52] U.S. Cl. .................................. 707/6; 707/101; 707/1
[58] Field of Search ..................... 707/6, 101, 1

[56] References Cited

U.S. PATENT DOCUMENTS

| | | | |
|---|---|---|---|
| 4,575,848 | 3/1986 | Moore et al. | 371/61 |
| 4,766,578 | 8/1988 | Yamazaki et al. | 368/69 |
| 5,282,180 | 1/1994 | Burke et al. | 368/46 |
| 5,425,004 | 6/1995 | Staffan | 368/46 |
| 5,442,599 | 8/1995 | Burke et al. | 368/46 |
| 5,463,547 | 10/1995 | Markowitz et al. | 707/507 |
| 5,471,631 | 11/1995 | Beardsley et al. | 395/650 |
| 5,566,138 | 10/1996 | Lombreschi et al. | 368/157 |
| 5,600,836 | 2/1997 | Alter | 395/612 |
| 5,630,118 | 5/1997 | Shaughnessy | 707/1 |
| 5,644,762 | 7/1997 | Soeder | 707/6 |
| 5,668,989 | 9/1997 | Mao | 707/101 |
| 5,719,826 | 2/1998 | Lips | 368/29 |

*Primary Examiner*—Wayne Amsbury
*Attorney, Agent, or Firm*—Schmeiser, Olson & Watts

[57] ABSTRACT

According to the present invention, an apparatus and method for processing date fields in computer systems without the negative implications of the turn of the century problem is disclosed. The proposed solution is known as the "system encapsulation" method. In a preferred embodiment of the present invention, the code for the application software running on the computer system is not modified in any way. Instead, the preferred methods of the present invention modify the date-dependent information in the computer system database files and resets the system clock by adding or subtracting a certain number of "offset" years from the dates being processed by the system (for example, 28 years). The two-digit date representations in the modified database contain both positive and negative two-digit date representations, allowing the processing of data that spans 199 years and covers portions of three different centuries. This approach allows the application software to process the date-dependent data normally.

16 Claims, 8 Drawing Sheets

APPARATUS AND METHOD FOR PROCESSING YEAR-DATE DATA IN COMPUTER SYSTEMS

BACKGROUND OF THE INVENTION

1. Technical Field

This invention generally relates to the processing of date related information in computer systems and more specifically relates to a system and method for overcoming date-related problems associated with a change in centuries.

2. Background Art

Since their initial introduction in the mid 1900s, computer systems have become an increasingly important part of our society. Most early computer systems are well-known for their large size and, by today's standards, relatively unimpressive performance. However inauspicious the beginning, today's computer systems have evolved into extremely sophisticated devices. Modern computer systems contain relatively complex software that the computer hardware executes in order for the computer system to perform its intended functions.

Due to the high cost of memory components in early computing systems, and also for convenience of computer system programmers, computerized date information has been and typically still is, stored in two-digit year-date data formats. In a two-digit year-date data storage format, the leading two digits of a four-digit year date are not explicitly stored in the computer's memory. This means that the year 1988 is represented internally within the computer system as "88." While this programming convention has been useful in conserving memory storage, there are some problems associated with this practice which are beginning to affect the computer systems that use a two-digit year-date data representation method.

Since the year-date data fields in the computer system are only tracking the last digits of a four digit year, there can be some confusion at the actual date represented by the two-digit representation as our society approaches the turn of the century. Because 1905 and 2005 are both stored in the computer system as "05," there is no way to directly differentiate between centuries. This also means that when the year 2000 arrives, many existing computer systems which use year-date calculations as an integral part of their data processing procedures will begin to experience data processing errors and ultimately, system failure.

Information processing systems such as those used for financial projections, forecasting, accounting, and inventory management typically include numerous records containing date-related and date-sensitive information. An incredible array of computer system processing problems loom on the horizon as computer systems throughout the world begin to operate as if it were the year 1900 instead of the year 2000. For example, 5-year financial projections for managing stock portfolios will not be able to generate accurate numbers. Inventory systems that track shelf life of products will suddenly be overwhelmed with products that appear to be terribly out of date. Life, home, and automobile insurance premium payments tracked by computer databases will immediately appear to be decades overdue and the corresponding policies will be canceled automatically by the same computer system.

Many solutions have been suggested to combat the turn-of-the-century computer system problem. However, most of these solutions involve the conversion of all two-digit years to four-digit years and simultaneously rewriting the application software programs that process the data to accommodate four-digit date representations. The drawbacks associated with such solutions are numerous. For example, all of the data fields in existing databases and flat files would require reformatting. Data definitions, date calculation methods and internal work areas in application programs would also require extensive reprogramming and/or reformatting. Similarly, all date-handling routines utilized by the application programs would need to be rewritten to accommodate four-digit year data. This means that substantially all of the existing software applications, whether custom designed or off-the-shelf, will require substantial file reformatting and rewriting of routines at great expense in terms of cost and time. Moreover, those small entities that rely on off-the-shelf products or third-party software solutions for information processing must rely on their vendors to implement such costly solutions before the turn of the century.

Consequently, a less onerous solution has been suggested in which the two digit years stored in databases are not converted to four-digit years. According to this solution, the application program code is modified so that the year-date data that is read from the application's master file or other data files is reduced by 28 years. In this way all dates up to Dec. 31, 2027 are reduced back into the twentieth century and all of the date processing can occur in a single century. Once the program data is converted back in time and processed, the resultant output year-date data is increased by 28 years so that the resulting output dates reflect the actual or correct date. 28 years has been selected because the calendar information from 28 years ago, including days of the week, holidays, and other similar date-related information all line up with the corresponding days in the present year.

A significant drawback associated with this solution is that it will still be necessary for a programmer to locate all of the points in the application program code where dates specified by the program data are input for processing or output after processing. At each of these points, new programming code ("bridges" or "patches") must be inserted into the existing application source code to perform the date conversion. Thus, each time the same year-date data is accessed by the application program it must be converted as program data by modified application code. In addition, some statistical databases use dates from the early 1900's and these dates will be converted into dates in the 1800's when 28 years are subtracted. For example, 1914 becomes 1886 and the issue of century determination becomes a problem once again.

Another problem with the programming solutions suggested to date is the simple logistics of re-writing millions and millions of lines of code or reprogramming the computer systems throughout the world in the relatively short period of time remaining between now and the turn of the century. There are simply not enough skilled programmers available who can attack and solve all of the year-date-related problems that computer systems are going to develop over the next few years. Many of the world's existing computer systems were programmed in computer languages such as FORTRAN or COBOL and many of today's computer programmers have never been exposed to these programming languages and the associated techniques required to update the existing applications written in these languages.

Another recently proposed solution is presented in U.S. Pat. No. 5,600,836. In this patent, a somewhat limited solution is disclosed whereby parts of a computer system are made to operate in "zone time." While this solution may be effective in certain environments, there are still some problems associated with this method. For example, the proposed solution will only handle database records with dates that span a time period less than 100 years, which is defined as the "zone time span." Database records which fall outside the zone time span are not processed and the information contained in these records may be lost. This limitation means that certain records must still be processed by a different method. In addition, this solution requires extensive use of secondary databases. These secondary databases include the "internal data file," the "master zone data file," and the "output zone data files." These additional database files constitute computer system overhead and will require additional computer resources such as physical memory storage, thereby decreasing system efficiency. Finally, there are a significant number of computer systems running in the world today where the original application program source code is no longer available for updates or revisions. In those situations, the solution described in U.S. Pat. No. 5,600,836 cannot be used because it requires fairly extensive modification of the original program source code in order to be implemented.

As the turn of the century approaches (defined herein as the year 2000), the information processing world is desperately seeking solutions to avoid catastrophic failures in systems with applications that process date-dependent information with two-digit year formats. Without a system and method for overcoming the significant limitations of the present two-digit year formats and operating computer systems beyond the year 2000, the computer systems which we depend on for so many things are at serious risk of significant disruption or even complete failure.

DISCLOSURE OF INVENTION

According to the present invention, an apparatus and method for processing date fields in computer systems without the negative implications of the turn of the century problem is disclosed. The proposed solution is known as a "system encapsulation" method. In a preferred embodiment of the present invention, the code for the application software running on the computer system is not modified in any way. Instead, the preferred methods of the present invention modify the date-dependent information in the computer system database and resets the system clock by adding or subtracting a certain number of "offset" years from the dates being processed by the system (for example, 28 years). This approach allows the application software to process date-dependent data normally.

BRIEF DESCRIPTION OF DRAWINGS

The preferred embodiments of the present invention will hereinafter be described in conjunction with the appended drawings, wherein like designations denote like elements, and.

BEST MODE FOR CARRYING OUT THE INVENTION

Figure 1:
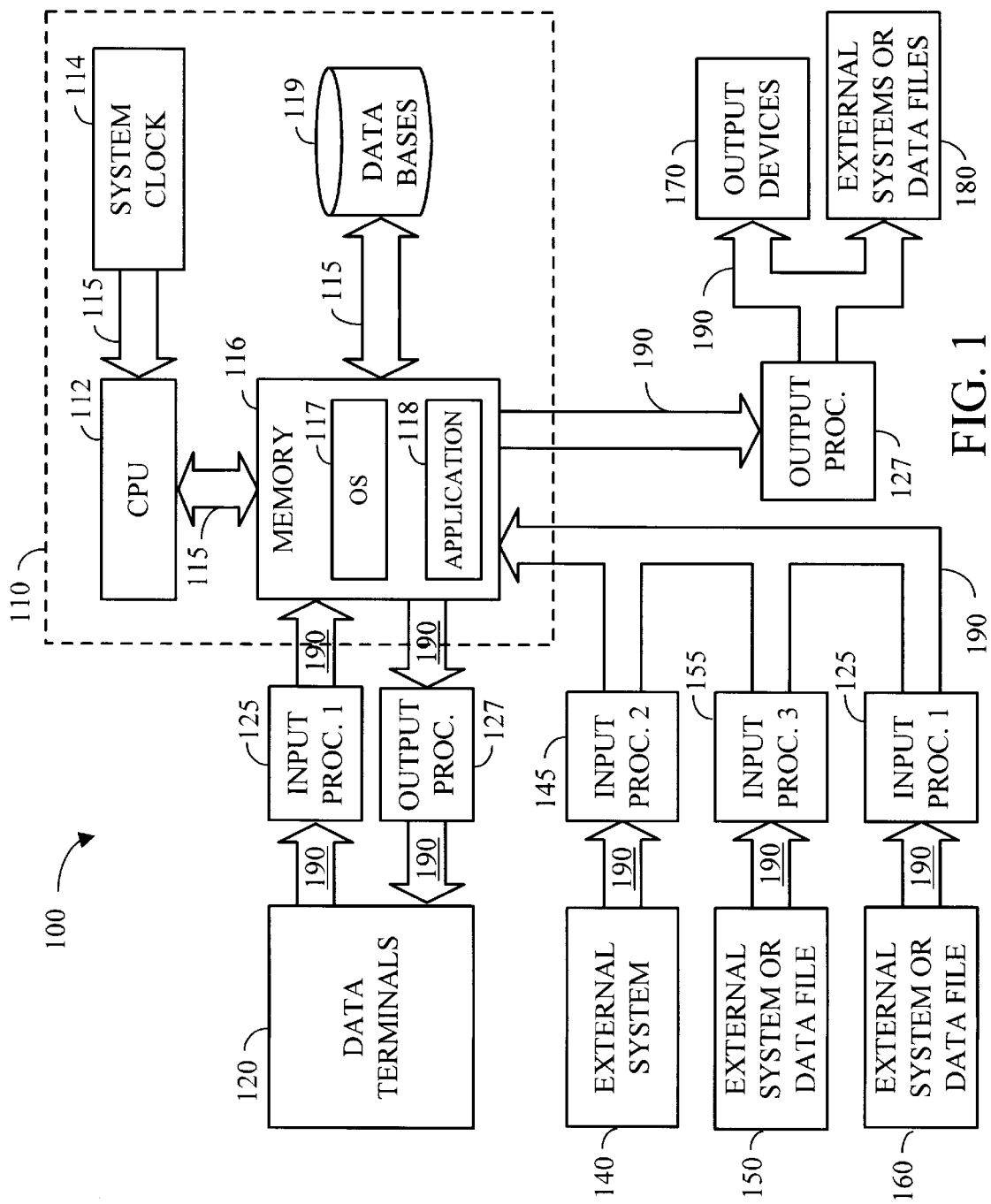
FIG. 1 is a block diagram of a system according to a preferred embodiment of the present invention.

The system encapsulation method of the present invention provides an apparatus and method for processing date fields in computer systems without the negative implications of the turn of the century problem. Specifically, the steps of the present invention include modifying the date-dependent information in the computer system database files and resetting the system clock by adding or subtracting a certain number of "offset" years from the dates being processed by the system (for example, 28 years). This approach allows the encapsulated computer system to use the existing application software to process the date-dependent data contained in the database files without the usual concerns associated with the year 2000. A preferred embodiment of the present invention uses positive and negative two-digit date representations within the encapsulated computer system to process date-related data spanning at least a 199 year period, providing a solution which can effectively cover date-related data from at least portions of three different centuries.

If the present year were the year 2000, using a preferred embodiment of the present invention where an offset period of 28 years is subtracted from the dates in the databases and all dates input into the system, the computer system and the application software can operate as if it were the year 1972 instead of the year 2000. This allows normal processing to take place in the computer system as it always has. After the data processing has taken place and the results obtained, the correct dates for output purposes can be calculated, if desired, by utilizing system bridges which add 28 years to the year-dates that are generated by the application software. 28 years has been selected as the offset period for one preferred embodiment of the present invention because the calendars, days of the week, holidays, and other date-related information all line up with the corresponding days in the present year. Other offset periods are possible and are discussed below.

The present invention relates to year-date data stored and processed in computer systems. For those individuals who are not well versed in the various year-date data storage formats presently used and the previously identified solutions for dealing with year-date data in the turn of the century scenario, the Overview section below presents many of the concepts that will help to understand the invention.

1. Overview

The previously implemented solutions to the Year 2000 problems have fallen into two main solution sets: the data encapsulation method and the program encapsulation method.

Data encapsulation is a method whereby the system's application programs are modified and used to process unchanged data residing in the system databases. The date is "encapsulated" or unchanged, and the application programs that handle the data are modified to account for problems that result from using a two-digit date format in the data. Program encapsulation, on the other hand, modifies the dates of the information in the databases, with applications that are "encapsulated," i.e, that remain unchanged. Neither of these methods adjusts the system clock in order to influence data processing results.

For the purposes of describing the present invention, five basic ways to store dates in database files are considered, and the methods of the present invention will vary based on the specific storage technique used. The five specific cases for representing and storing year-date data are described below. CASEs I, II, and III year-date data representation conventions are typically encountered in typical input/output processing as well as with year-date data stored in databases. CASEs IV and V both deal almost exclusively with year-date data stored in databases. The methods of the present invention include specific procedures for converting the year-date data for each of the five cases.

Case I. Some computer systems store year-date data in database fields by using three or four digits to represent the year. This provides the simplest conversion scenario because there are no special testing conditions required to identify the century for the year-date data.

Case II. Some computer systems store all year-date data using a two digit date field and all dates in the databases are in the same century. An example of dates stored in this type of system would be "15"=1915, "45"=1945, "78"=1978, "97"=1997, etc. Systems which use this type of year-date data will experience significant problems as the year 2000 approaches.

Case III. Some systems use year-date data where all of the dates are in two centuries and the two digits used to represent the dates in the earlier century are larger then the two digits used to represent the furthest in the future date in the more recent century (i.e., 1940 to 2020). In this case, the dates stored in the two digit codes would be 40 to 99 (for the 1900 dates) and 00 to 20 (for the 2000 dates).

Case IV. This situation occurs when there are records with two digit year-date data that contain dates in more than one century; i.e., 15, 45, 75, 97, 05, 15=1915, 1945, 1975, 1997, 2005, 2015. Since the records in the database span more than one century, and since the two-digit dates "overlap," the correct centuries for each of the records must be determined. In this case, it is assumed that there is some alternative method of identifying the correct century for the suspect records. This can typically be accomplished by examining the record number or date of creation for the individual records. By matching this type of information with the two digit year-date data, the correct century and year can be identified and the records can be successfully converted for further processing.

Case V. This situation is similar to that described above for Case IV but in this case some of the year-date data cannot be easily associated with a specific century; i.e., 45, 15, 79, 10, 99, 97=1945, ??15, 1979, ??10, ??99, 1997. In this case, the questionable records will have to be marked and examined manually to try and determine the correct century for each record. If the correct century for the questionable records can't be identified by manual means, the questionable record will have to be removed in order to preserve data integrity for later processing.

Those skilled in the art will realize that the concepts of the present invention may be applied to other cases as well, whether currently known or developed in the future.

2. Detailed Description

At a conceptual level, the present invention can be viewed as a three-step process. The first step of the process involves adding or subtracting a fixed number of years from most year date fields in all of the databases and tables that are used by all of the applications on the system. In one preferred embodiment of the present invention, 28 is adopted as the number of years to be subtracted. As explained earlier, 28 years has been selected because most calendar-related items such as the days of the week, holidays, and other information all line up with the corresponding days in the present year. It is important to note that various preferred embodiments of the present invention will use multiples of 28 (i.e., n×28) which can be either added or subtracted from the dates contained in the database files.

The second step of the process is to place small software bridges between the system and all input/output (I/O) peripherals, as well as all external systems. These software bridges essentially allow the encapsulated computer system to communicate with the rest of the world in the appropriate time frame reference. Most of these bridges are optional and are supplied for the convenience of the users. The actual use of various bridges will be an engineering decision that may vary from system to system.

The third and last step of the process is changing the internal system clock date on the encapsulated computer system that passes time/date critical information to the software applications running on the main system. Generally, no time/date critical information is passed between the secondary systems. Once these steps have been accomplished, the entire computer system has been "encapsulated" and will be operating as if it were 28 years earlier.

It is important to note that the present invention does not provide a permanent solution to date-related computer problems. However, once the present invention has been implemented, the computer system should be able to operate for an extended period of time without any date-related computer problems. Depending on the nature of the computer system and the applications on the computer system, this "grace" period will range from 5 to 84 years. The present invention will eventually have to be uninstalled unless the system life span is limited to the operational time period extension offered by implementing the present invention. The present invention is uninstalled by basically reversing the installation procedures.

For most computer systems, the grace period afforded by the present invention will allow ample opportunity to contract with a Year 2000 consulting firm that can reconfigure the application software to eradicate the date-related problems within the applications. It is anticipated that by adopting the system and method of the present invention, most companies can delay the costs associated with reprogramming extensive amounts of application software until well after the turn of the century.

By delaying the inevitable conversion of a system for five to fifteen years, it is further anticipated that highly skilled Year 2000 programmers will be available for implementing well-proven solutions at greatly reduced rates. Since most companies are working feverishly to convert their systems prior to the year 2000, the current overwhelming need for Year 2000 programmers will decrease significantly after the year 2000. As demand for skilled Year 2000 programmers dwindles, the cost of manpower required to remedy a given system's Year 2000 will likewise diminish. The laws of supply and demand will weigh heavily in the favor of those businesses that can wait to convert their systems. Therefore, implementation of the present invention should allow for more cost effective alternative solutions if businesses adopt the methods of the present invention.

Referring now to FIG. 1, a system according to a preferred embodiment of the present invention includes: an encapsulated computer system 110; data terminals 120; an external system 140; external systems or data files 150 and 160; input processes 125, 145, and 155; an output process 127; output devices 170; external systems or data files 180; and a series of communications links 190. The various input and output procedures are used to convert the data that flows into and out of encapsulated system 110 and are described more fully below.

Encapsulated computer system 110 includes a central processing unit (CPU) 112; a system clock 114; a memory 116 which contains operating system 117 and applications 118; system bus 115; and databases 119. Databases 119 may be stored in various ways and in multiple locations. For example, databases 119 may represent a central data storage location which is geographically remote from CPU 112 and memory 116. Alternatively, databases 119 could also be stored in memory 116. Databases 119 do not represent a single, particular physical storage location but represent, instead, the accumulation of files, records, etc. that are manipulated by system 100 CPU 112 is part of the hardware that is used to perform computation and control functions of system 100. All CPUs 112 associated with system 100 may each individually comprise a single integrated circuit, such as a microprocessor, or may comprise any suitable number of integrated circuit devices and/or circuit boards working in cooperation to accomplish the functions of a central processing unit. All CPUs 112 are capable of suitably executing the programs (operating system 117 and applications 118) contained within memory 116 and acting in response to those programs or other activities that may occur in system 100.

System bus 115 serves to transmit programs, data, status and other forms of information or signals between the various components of encapsulated system 110. The preferred embodiment for system bus 115 is any suitable physical or logical means of connecting computer systems and components known to those skilled in the art. This includes, but is not limited to, direct hard-wired connections, Internet connections, Intranet connections, fiber optics, infrared (IR) and other forms of wireless connections. It is anticipated that many alternative methods and material for connecting computer systems and components will be readily adapted for use with the present invention. This would include those methods and materials not presently known but developed in the future.

Operating system 117 includes the software which is used to operate and control encapsulated system 110. Operating system 117 is typically executed by CPU 112. Operating system 117 may be a single program or, alternatively, a collection of multiple programs which act in concert to perform the functions of an operating system.

Applications 118 represent the application software programs that are used to process the data, including the year-date data contained in databases 119. In addition, applications 118 may receive additional input from data terminals 120, external system 140, and external systems or data files 150 and 160. Applications 118 are typically executed by CPU 112.

Memory 116 is any type of memory known to those skilled in the art. This would include Dynamic Random Access Memory (DRAM), Static RAM (SRAM), flash memory, cache memory, etc. While not explicitly shown in FIG. 1, memory 116 may be a single type of memory component or may be composed of many different types of memory components. In addition, memory 116 and CPU 112 may be distributed across several different computers that collectively comprise system 100. System 100 of FIG. 1 simply illustrates many of the salient features of the invention, without limitation regarding the physical location of CPU 112 or specific memory locations within memory 116.

Data terminals 120 may include any type of date input/output terminals known to those skilled in the art. Cathode Ray Tube monitors (CRTs), dumb terminals, PCs operating in emulation mode, workstations, Automatic Teller Machines (ATMs), Point of Sale (POS) cash registers, etc. are all examples of the types of equipment which may be considered to be data terminals 120.

External system 140 may be a geographically remote computer system or may be representative of another encapsulated system 110. An example of this would be a company computer system with multiple, independent systems linked by an Intranet. Alternatively, external system 140 may be a data-gathering device with sensors and other mechanisms for retrieving, storing, transmitting, and receiving data.

External system or data file 150, 160 and 180 can be broadly characterized to include almost any type of device or file which is capable of communicating with encapsulated system 110. These may include secondary storage devices, geographically remote computer systems, etc.

Output devices 170 are any and all devices which are capable of receiving data from encapsulated system 110. This would typically include output devices such as printers, terminals, Direct Access Storage Devices (DASDs), etc.

Communication links 190 serve to transmit programs, data, status and other forms of information or signals between the various components of system 100. The preferred embodiment for communication links 190 is any suitable physical or logical means of connecting computer systems and components known to those skilled in the art. This includes, but is not limited to, direct hard-wired connections, Internet connections, Intranet connections, fiber optics, infrared (IR) and other forms of wireless connections. It is anticipated that many alternative methods and material for connecting computer systems and components will be readily adapted for use with the present invention. This would include those methods and materials not presently known but developed in the future.

While shown as separate and distinct connections, it is important to note that some of the input and output paths identified in FIG. 1 may, in fact be connected to the same external system or data file. For example, in one preferred embodiment of the present invention, external system or data file 160 and external system or data file 180 may be the same system or data file. Additionally, data terminals 120 may, in certain preferred embodiments of the present invention, be the same devices as those represented by output devices 170.

All of the various devices, systems, and files shown may, in certain embodiments, provide input data to encapsulated system 110 and may, after the data is processed by encapsulated system 110, receive output data from encapsulated system 110 as indicated in FIG. 1. In most typical computer systems, many files and devices act as both input and output files or devices. In that case, there will be both input and output routines associated with the transfer of data to and from encapsulated system 110.

Figure 2:
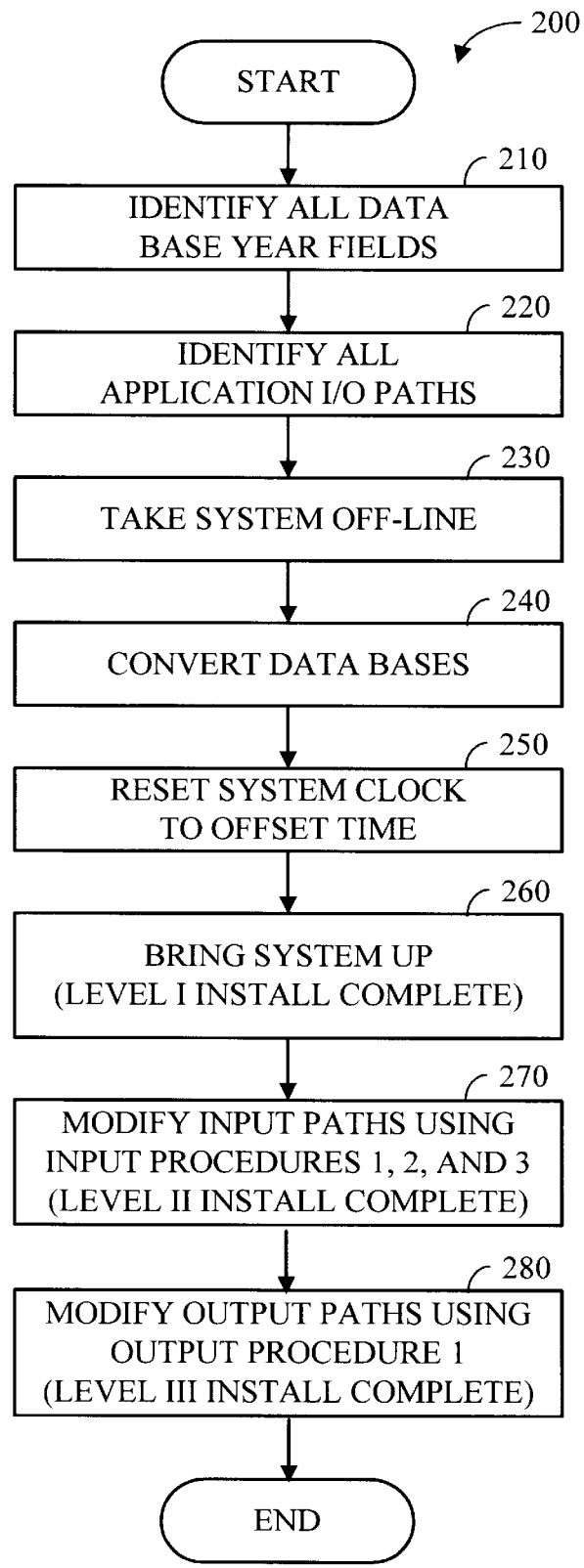
FIG. 2 is a flow chart for installing a system encapsulation method according to a preferred embodiment of the present invention.

Referring now to FIGS. 1 and 2, a process 200 is used to encapsulate a system in accordance with a preferred embodiment of the present invention. The first step in process 200 is to identify all database year-date data storage fields (step 210). Next, system 100 is examined to locate and identify all application input/output (I/O) paths for encapsulated system 110 (step 220). This means that all entry and exit points into or out of encapsulated system 110 for all of the data that is processed by application software packages 118 must be identified. Examples of the various types of I/O paths that may be identified for a typical system include dumb terminals, printers, analog to digital converters, etc. Next, encapsulated system 110 is taken off-line or shut down (step 230). After the I/O paths have been identified, all year-date data contained in databases 119 used by applications 118 are converted (step 240). Depending on the type of data being stored and the exact storage format of the date-related data, the conversion process may be slightly different. The various conversion procedures are described in detail below.

After the data conversion of step 240, system clock 114 is reset by adding or subtracting an "offset period" to the actual date and time to create an "offset time" (step 250). The offset time is typically 28 years earlier than the actual time. While one preferred embodiment of the present invention subtracts 28 years from the actual date and time, multiples of 28 years may be used as the offset period (i.e., 56 years or 84 years) and the offset period may be added to or subtracted from the actual time to create the offset time. Whether the offset period should be 28 years or 56 years and whether the offset period should be added or subtracted depends on the exact type of data that is contained in databases 119. The procedures for making the decisions regarding the selection of the offset period are discussed in greater detail below. At this point, encapsulated system 110 may be brought back into its normal operating state (step 260).

The next step in process 200 is to modify all of the input paths that were identified in step 220 (step 270). The modification involves installing a software bridge or a series of software bridges between encapsulated system 110 and any input path that provides data to encapsulated system 110. It should be noted that some of the bridges will produce negative numbers for the converted year-date data. This allows the methods of the present invention to easily handle a 199-year span in a two-digit year-date data format. This allows a system according to a preferred embodiment of the present invention to be utilized with year-date data from three different centuries. By converting all year-date data stored or used within encapsulated system 110 to a two-digit year-date format, application 118 need not be modified at all to process the year-date data flowing into encapsulated system 110.

Finally, all of the output paths identified in step 220 are modified by installing a software bridge or a series of software bridges between encapsulated system 110 and any output path that receives data from encapsulated system 110 (step 280). As indicated earlier, some input paths and output paths to encapsulated system 110 may be providing data to and receiving data from the same external device, system or file. It is important to note that the output path procedures are optional and are used for the convenience of the system users.

After process 200 has been completed, system 100 is completely operational and normal processing can take place without the typical problems associated with two-digit year-date representations. To remove or uninstall the present invention, the process identified in steps 210–270 is essentially reversed.

The removal process is further detailed in conjunction with the descriptions accompanying FIGS. 10, 11, and 12 below. Levels I, II, and III refer to different levels of implementation and are provided as reference points.

Calculating the Offset Period (N) and Offset Time

An important part of using a preferred embodiment of the present invention is calculating the offset period. In general, the offset period is a multiple of 28. To calculate the offset period, the data stored in databases 119 must be examined to locate the date that is the farthest in the future. Some databases 119 may contain dates well into the $21^{st}$ century. In addition, it is important to look beyond the actual dates stored in databases 119 to determine how far into the future any system calculations or forecasts will go. After this farthest into the future date has been identified, a multiple of 28 years is chosen for the offset period so that when the offset period is subtracted from the date that is the farthest in the future, the result yields a date that is earlier than 1995.

As a rule of thumb, if the date that is the farthest in the future as stored, calculated, or forecast does not exceed the year 2020, then the offset period should be 28 years and the offset period should be subtracted from the actual time when setting system clock 114 as identified in step 240 above. The actual equation for calculating the offset time is:

offset time=actual time−offset period where the offset period is (28*"n") and where "n" equals an integer, i.e. 0,1,2,3, etc. Generally, "n" will be equal to 1 or 2 and rarely will "n" be greater than 3. The only time "n" will be equal to 0 is when the present invention is to be removed from system 100. When "n" equals 0, the offset period is 0 and the offset time and the actual time are the same.

While this is the general rule, it is important to remember that there are situations where the offset period should be added rather than subtracted from the actual time. This is usually the case when the data contained in databases 119 covers a very small time span and there are applications 118 that perform forecasting for a period of fifty or more years into the future. It is anticipated that these situations will be fairly rare. While most systems can simply use a value of 1 for "n," a specific example of the procedure for obtaining the value of "n" for the purposes of calculating the offset period is explained below.

Assume that the year-date that is the furthest in the future as explicitly contained in databases 119 is determined to be 1998. Further, assume that the system uses a four year forecasting cycle. This yields a date of 2002 as the date that is the furthest in the future for system 100. To calculate "n," seven years are added to the year 2002 which, in this case, yields a result of 2009. The two rightmost digits of the resultant year are then divided by 28. For this example, 09/28=0.3214. Use the integer value of the result of the division (i.e., disregard any decimal value of the division) and add "1" to reach the appropriate value of "n." In this case, "n" will be 1 (0+1=1). This value of "n" will, in turn, yield an offset period "N" which is 28 years (28*1=28).

Once the offset period N has been determined, it will be used to provide a converted year-date for all of the date fields contained in the database files. The application of the offset period will be determined by how the individual database files store the dates as discussed earlier in relation to Cases I–V. The use of the offset period will be better understood by discussing FIGS. 3–12. It should be noted that all of the example procedures illustrated below assume system clock 114 is to be set back by the calculated offset period. If, for a specific database scenario, system clock 114 is to be set forward, the positive or negative value of N will be opposite for all equations that are shown in the figures below (i.e., instead of subtracting N, add N).

Figure 3:
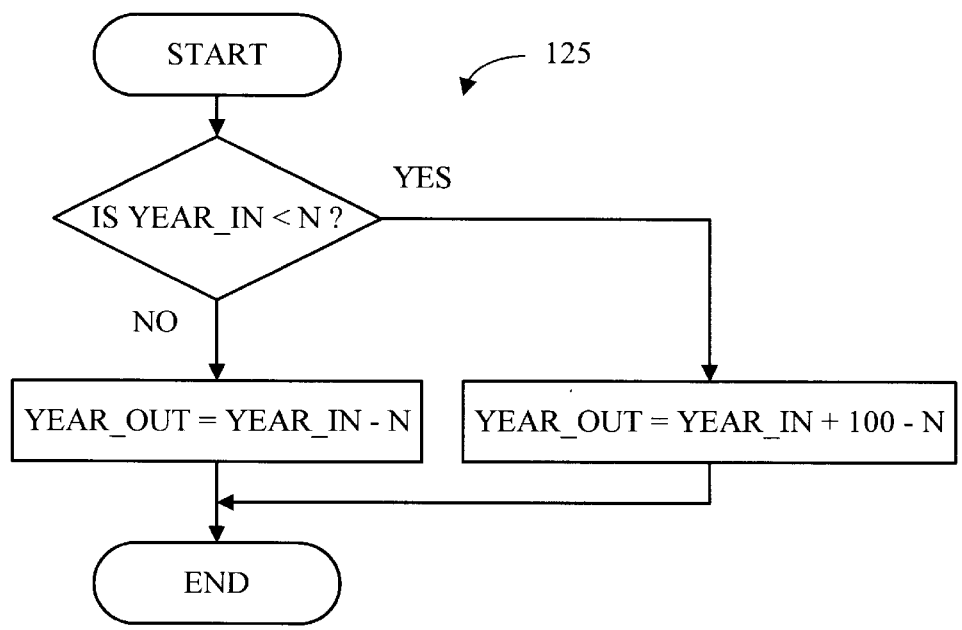
FIG. 3 is a flow chart for a year-date data input conversion procedure in accordance with a preferred embodiment of the present invention.

Referring now to FIGS. 1, 2, and 3, input procedure 125 is used to convert incoming year-date data (YEAR_IN) from data terminals 120 for use in encapsulated system 110. Input procedure 125 is used to convert year-date data represented in a two digit format where the year-date data is from two contiguous centuries (i.e., 1900 and 2000) and the largest YEAR_IN date is less than the value of the largest century date +N (i.e., 2000 +N for the centuries 1900 and 2000). After analyzing the incoming data streams as explained in step 220 of FIG. 2, the appropriate locations for installing input procedure 125 are known. YEAR_OUT is a date value that is determined based on the value of YEAR IN as shown in FIG. 3. This procedure is used to convert both Case II and Case III date representations from the centuries 1900 and 2000 for use in encapsulated system 110. For FIGS. 3, 4, 5, 6, 7, 8, 9, 11, and 12, it should be noted that YEAR_IN always refers to the year-date data being read from a database record or year-date data being brought into encapsulated system 110 and YEAR_OUT always refers to the converted year-date data being stored or output by encapsulated system 110.

Figure 4:
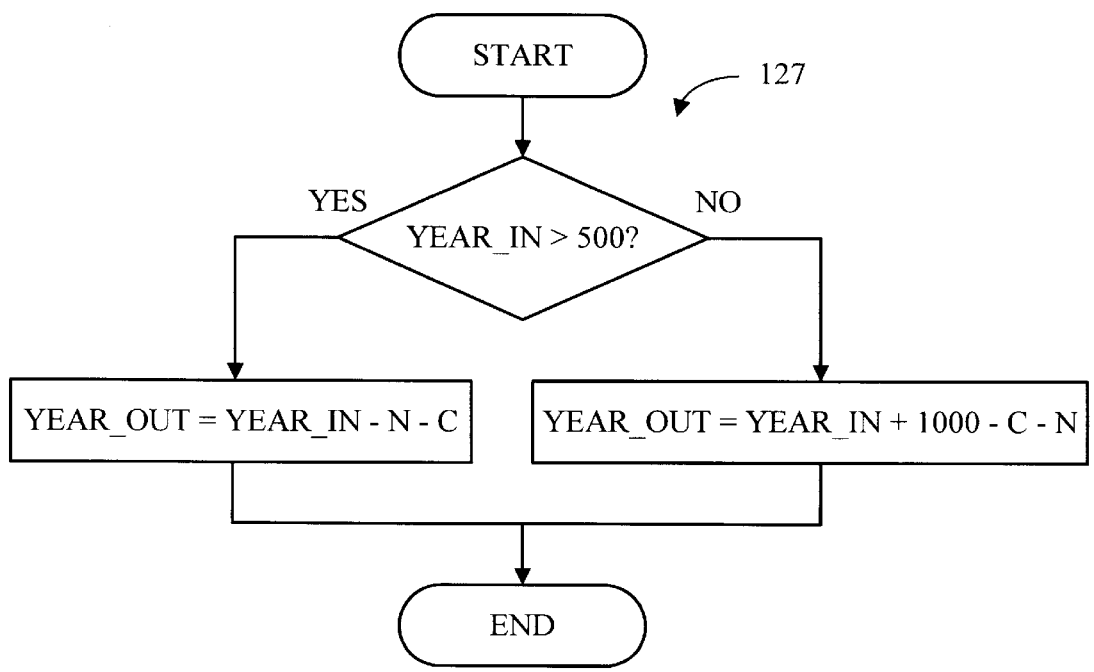
FIG. 4 is a flow chart for an alternative year-date data input conversion procedure in accordance with a preferred embodiment of the present invention.

Referring now to FIGS. 1, 2, and 4, input procedure 145 from FIG. 1 is used to convert incoming year-date data (YEAR_IN) for use in encapsulated system 110. Input procedure 145 is used to convert year-date data which are represented in a three-digit format (i.e., 1975=975) or standard four digit format. YEAR_OUT is a year-date value that is determined based on the value of YEAR_IN as shown in FIG. 4. "C" has a value of 900 for the contiguous centuries 1800, 1900, and 2000. After analyzing the incoming data streams as explained in step 220 of FIG. 2, the appropriate locations for installing input procedure 145 are known. This procedure is used to convert Case I three-digit date representations. It should be noted that the procedure shown in FIG. 4 is also used in step 730 of FIG. 7.

Figure 5:
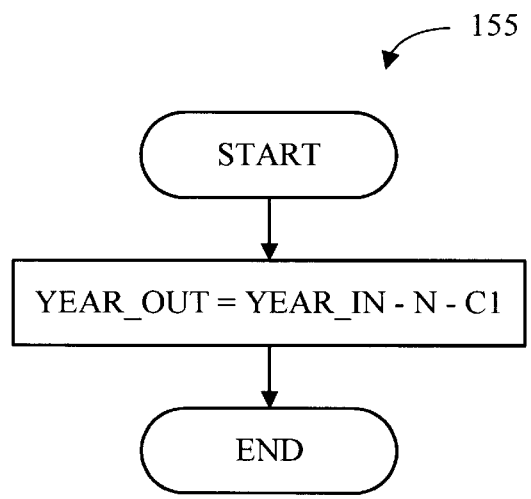
FIG. 5 is a flow chart for an alternative year-date data input conversion procedure in accordance with a preferred embodiment of the present invention.

Referring now to FIGS. 1, 2, and 5, input procedure 155 from FIG. 1 is used to convert incoming year-date data (YEAR_IN) for use in encapsulated system 110. Input procedure 155 is used to convert year-date data which are represented in a standard four digit format. YEAR_OUT is a year-date value that is determined based on the value of YEAR_IN as shown in FIG. 5. "C1" is the middle century of the three contiguous centuries, the current century, the previous century and the next century (i.e., C1=1900 for the centuries 1800, 1900, and 2000). Using procedure 155 as shown in FIG. 5, YEAR_OUT dates are restricted to a 199 year span. After analyzing the incoming data streams as explained in step 220 of FIG. 2, the appropriate locations for installing input procedure 155 are known. This procedure is used to convert Case I four-digit date representations.

Figure 6:
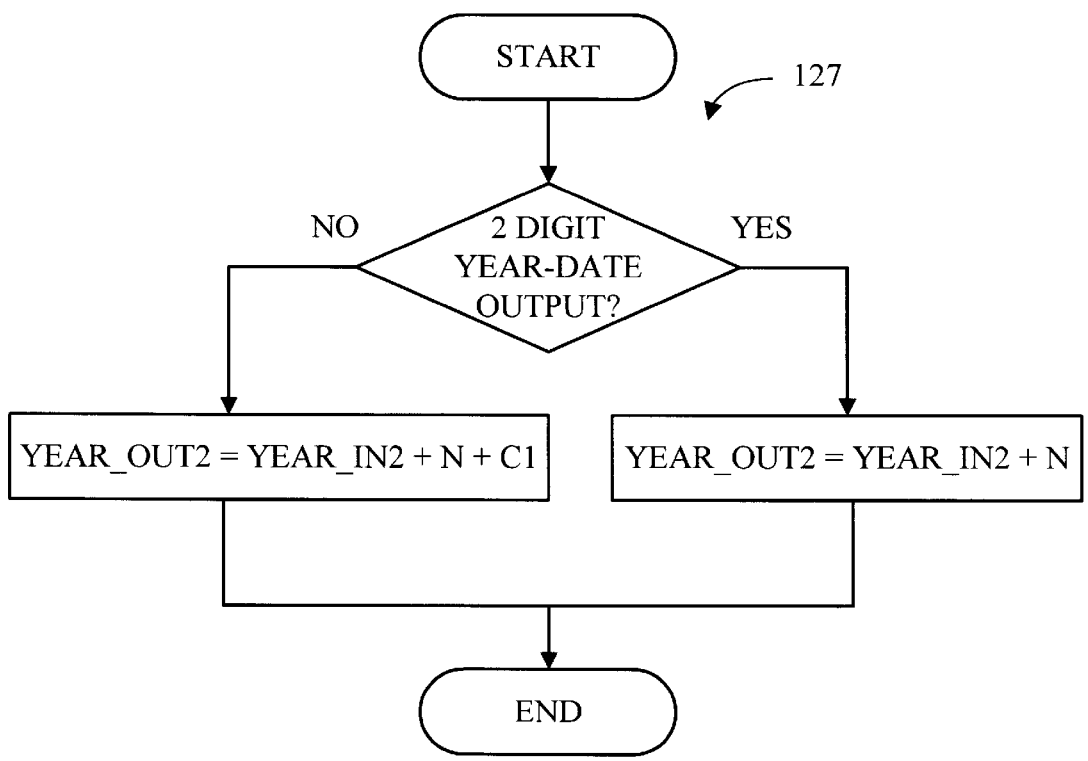
FIG. 6 is a flow chart for a year-date data output conversion procedure in accordance with a preferred embodiment of the present invention.

Referring now to FIGS. 1 and 6, output procedure 127 from FIG. 1 is used to convert the year-date data that was previously converted for use within encapsulated system 110 to a standard four-digit year-date data format. Procedure 127 should be used in every location in system 100 where the output from encapsulated system 110 is desired to be displayed, printed, or stored in a standard four-digit year-date data format. It is important to note that the use of procedure 127 is optional and is not necessary for application 118 in encapsulated system 110 to perform data processing. Only if the actual date is to be displayed, stored or printed somewhere is it necessary to re-convert the year-date data output from encapsulated system 110. To accomplish the output conversion as shown in FIG. 6, N and C1 are added to two-digit year-date data (YEAR_IN). For example, using output procedure 127 and once again assuming that N=28, the two-digit date −42 would be converted to 1886 (1900+28−42).

Figure 7:
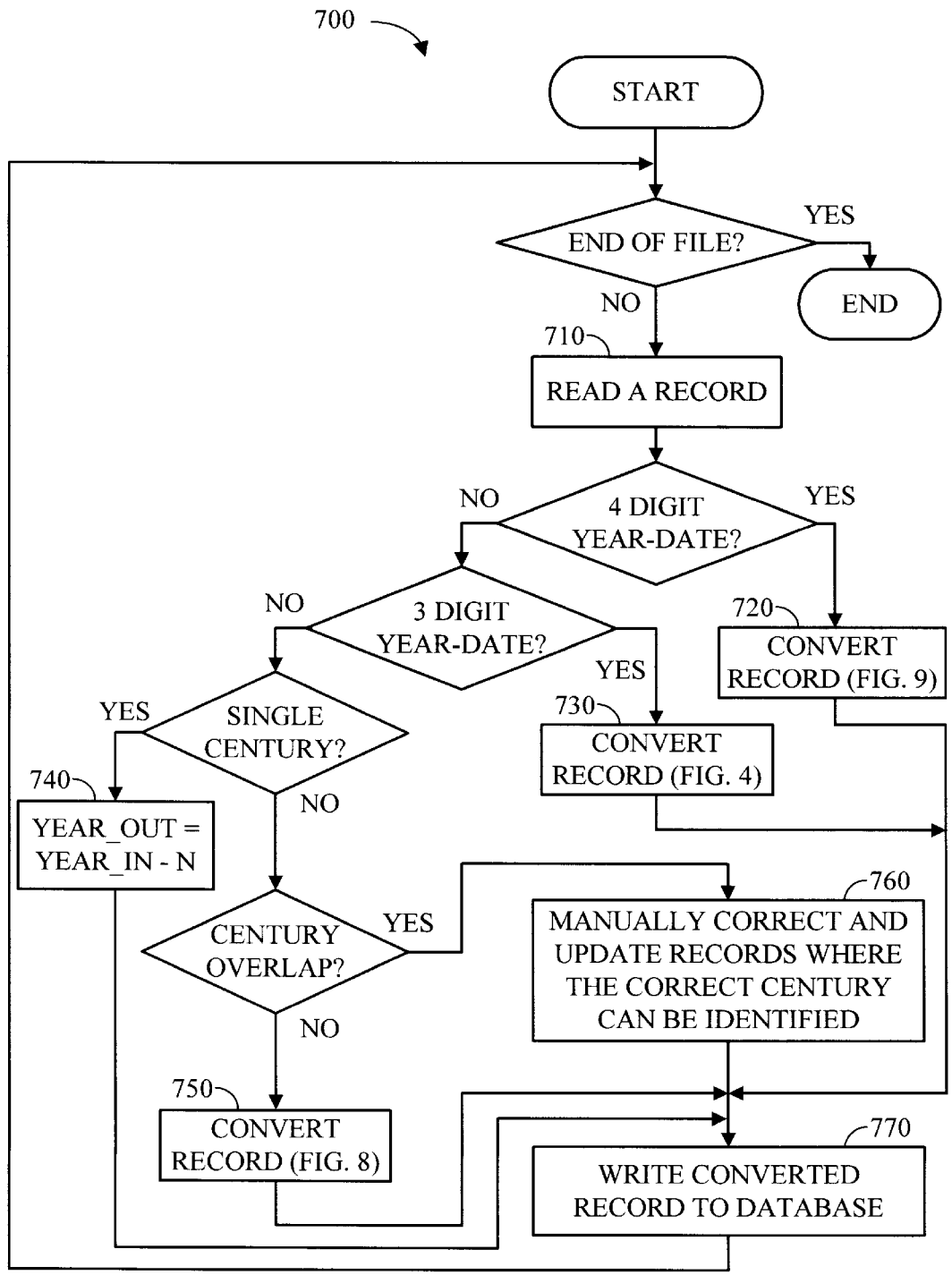
FIG. 7 is a flow chart of a year-date database record conversion method used when installing an encapsulation system according to a preferred embodiment of the present invention.

Referring now to FIGS. 1, 2, and 7, a process 700 is used to convert the year-date data stored in databases 119 prior to the final encapsulation of a system 100. The year-date data contained in databases 119 is converted once at the beginning of the installation process (step 230 of FIG. 2) and is not reconverted until the present invention is to be uninstalled.

In process 700, all five of the various year-date representations (Cases I–V) discussed above can be accounted for so that any type of year-date data can be utilized with encapsulated system 110. As part of the installation process, each and every database 119 is converted using method 700. As depicted in FIG. 7, process 700 is operated as a loop and is repeated for each record in database 119. Once all the records contained in database 119 have been processed, the database 119 is ready for use with encapsulated system 110.

Figure 8:
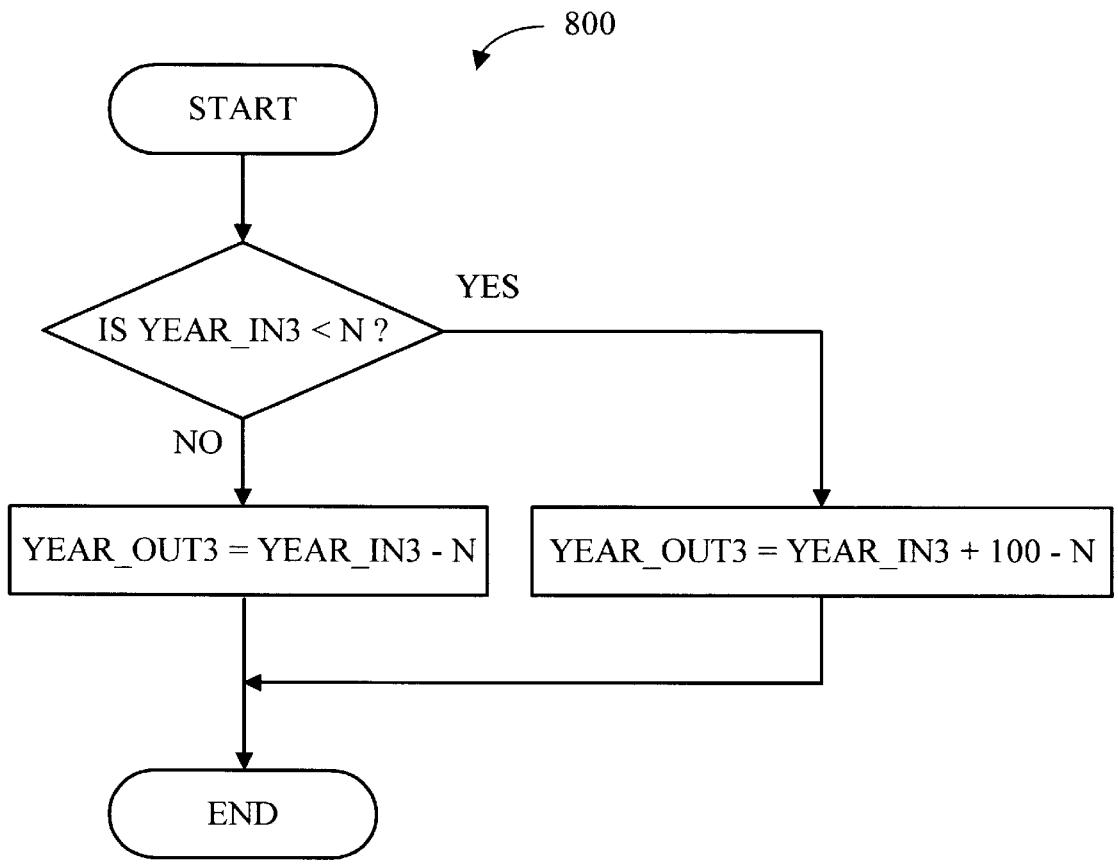
FIG. 8 is a flow chart of a year-date data conversion procedure used in conjunction with the method of FIG. 7.
Figure 9:
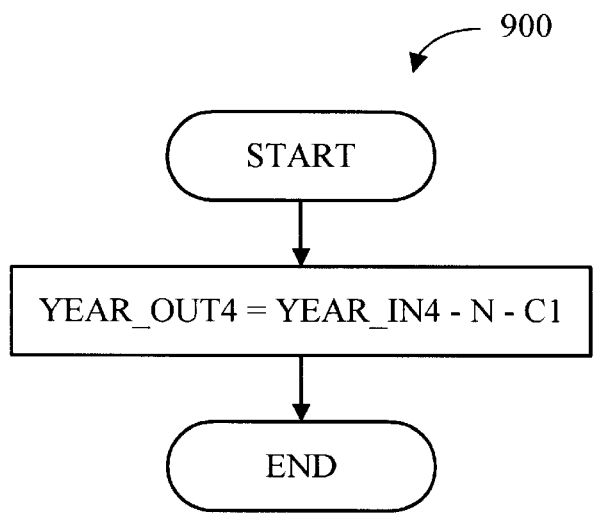
FIG. 9 is a flow chart of an alternative year-date data conversion procedure used in conjunction with the method of FIG. 7.

Process 700 consists of a series of tests to determine the representation of the year-date data contained in database 119. Initially, and repeatedly until all records have been processed, a record is read from database 119 (step 710). If the year-date data in database 119 is represented by a four-digit year-date representation, then the process shown in FIG. 9 should be used to convert the four-digit year-date data to a two-digit year-date representation (step 720). It should be noted that the process depicted in FIG. 5 and the process depicted in FIG. 9 are the same. The process depicted in FIG. 3 and the process depicted in FIG. 8 are also the same. FIGS. 8 and 9 are used for the initial conversion of database 119 while the process depicted in FIGS. 3 and 5 are used by system 100 for processing year-date data after implementation. These processes have been separately identified for purposes of explanation in the context of database record conversion and I/O year-date data conversion. If the year-date data in database 119 is represented by a three-digit year-date representation, then the process shown in FIG. 4 should be used to convert the three-digit year-date data to a two-digit year-date representation (step 730). Steps 720 and 730 are used to convert date-representations which corresponds to Case I as described above.

If the year-date data in database 119 is represented by two-digit year-date representations, then additional testing is required before database record conversion can take place. If all of the year-date data contained in database 119 are in the same century, then the year-date data falls into Case II as described above. In this case, the year-date data (YEAR_IN) is converted to YEAR_OUT by simply subtracting N from YEAR_IN (step 740).

If the two-digit year-date data representations span two centuries, then, once again, additional testing is required. If there is no overlap between the dates in the first century and the dates in the second century, then the year-date representations are Case III and the records are converted using the procedure shown in FIG. 8 (step 750).

After screening the year-date data for Cases I–III, all remaining records will be either Case IV or Case V. If the correct century for the records can be identified by external means, then the records fall in Case IV and the records should be manually converted using a process where the YEAR_OUT is equal to the YEAR_IN−N with a possible century correction, depending on which century is identified for the given record (step 760). However, if the correct century for the records cannot be identified, then the records in Case V and must be removed before processing can take place.

Regardless of the initial year-date data representation for the records contained in database 119, after the year-date data has been converted, the converted year-date data is stored back into database 119 (step 770). This processing according to process 700 is repeated until the end of the file is reached and all of the records contained in database 119 have been converted.

Referring now to FIG. 8, a procedure 800 is used to convert year-date data represented in a two digit format where the year-date data is from two contiguous centuries (i.e., 1900 and 2000) and the largest YEAR_IN date is less than the value of the largest century date+N (i.e., 2000+N for the centuries 1900 and 2000). This procedure will convert Case II and Case III two-digit date-representations.

Referring now to FIG. 9, a process 900 is used to convert data represented as four-digit year-date data for processing by encapsulated system. YEAR_OUT4 is a year-date value that is determined based on the value of YEAR_IN4 as shown in FIG. 9. "C1" is the next most recent century, i.e. 1900.

This completes the discussion of the installation of the present invention. The remaining figures will provide a brief overview of the procedures used to uninstall or remove the present invention. As mentioned previously, the present invention is intended to be a temporary solution that will provide the operators of an existing computer system with enough time to gracefully transition to a new system.

Figure 10:
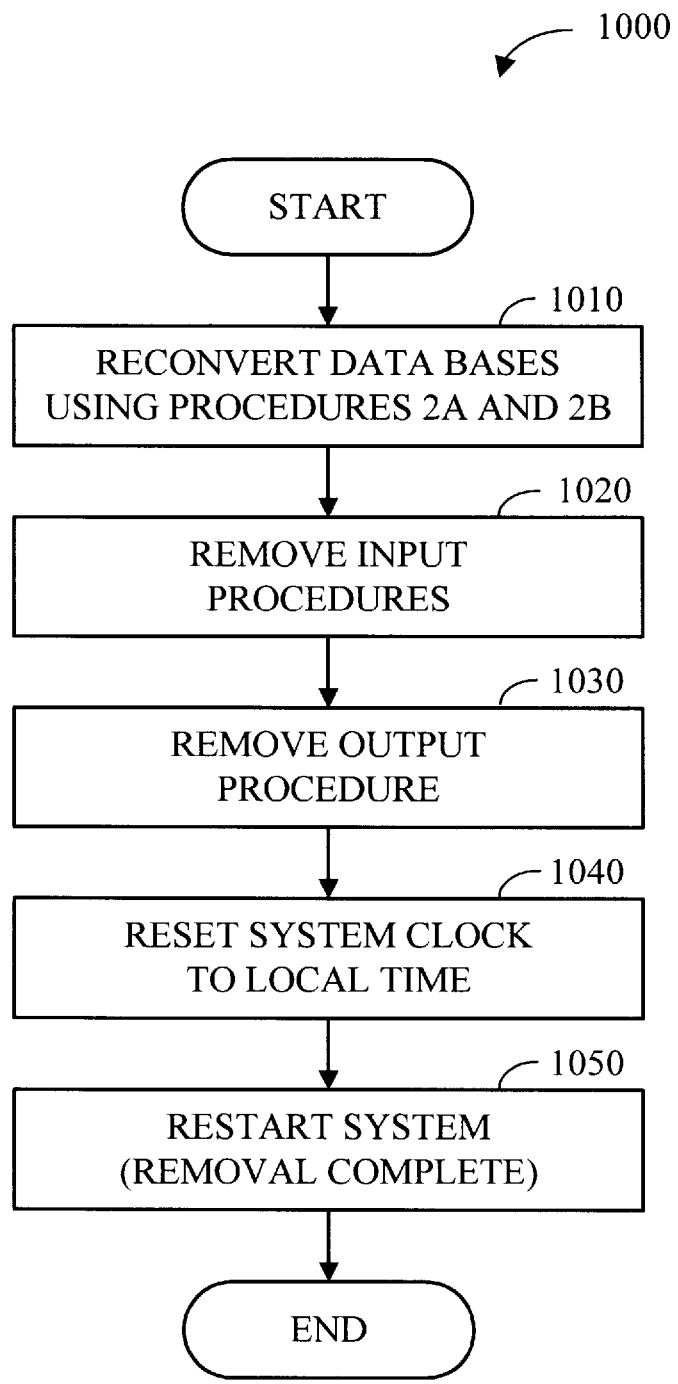
FIG. 10 is a flow chart for uninstalling a system encapsulation method according to a preferred embodiment of the present invention.

Referring now to FIGS. 1 and 10, a process 1000 is used to uninstall the present invention from system 100 shown in FIG. 1. In order to uninstall the present invention, the year-date data contained in databases 119 are reconverted using the procedures shown in FIGS. 11 and 12 (step 1010). Then the input procedures previously installed at the I/O paths of encapsulated system 110 are removed or deactivated (step 1020). Similarly, output procedure 127 is then removed or deactivated (step 1030). At this point, system clock 114 is reset to the actual or local time instead of the offset time (step 1040) and encapsulated system 110 can be restarted (step 1050). System 100 will be operational as before. Process 1000 is typically completed after all desired Year 2000 changes have been made to applications 118 and when encapsulated system is updated to handle four-digit year-date data representations.

Figure 11:
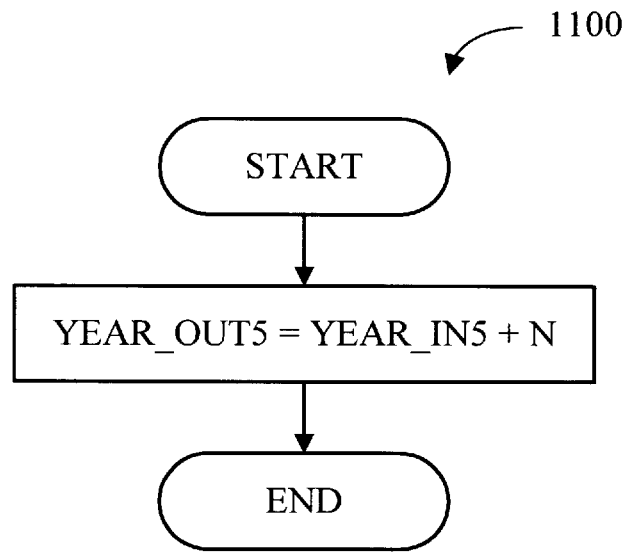
FIG. 11 is a flow chart of a year-date data conversion procedure used in conjunction with the method of FIG. 10.

Referring now to FIGS. 1 and 11, a process 1100 is used to convert the two-digit year-date data that has been processed by encapsulated system 110 back into a two-digit year-date format for use by external systems. If additional two-digit year-date data items from a different century have been added to the database after the initial installation, there may be some ambiguous year-date references.

Figure 12:
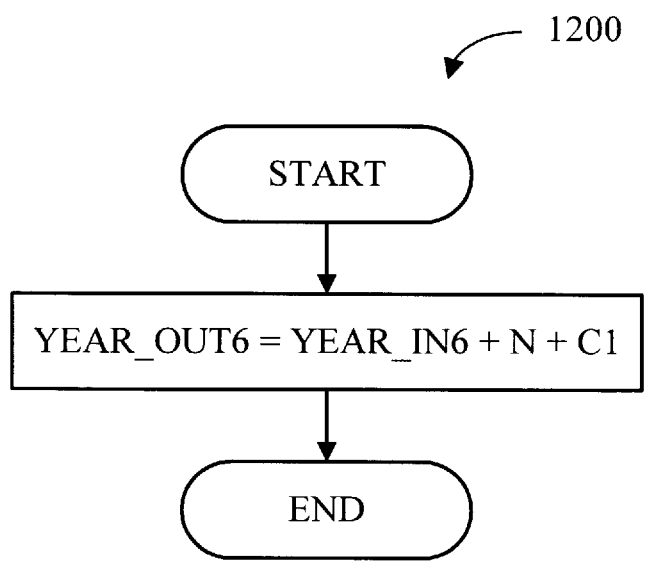
FIG. 12 is a flow chart of a year-date data conversion procedure used in conjunction with the method of FIG. 10.

Referring now to FIGS. 1 and 12, a process 1200 is used to convert the two-digit year-date data representations in database 119 to a standard four-digit year-date representation. This should only be accomplished after database 119 has been prepared to handle four-digit year-date data representations. The processes depicted in FIG. 6 and 12 are the same.

3. Additional Points of Consideration
Three Century Operation

One significant advantage of a system according to a preferred embodiment of the present invention is the ability to work with various year-date data representations that span more than two centuries using two-digit year-date data representations. As explained above, current century year dates are positive and the previous century year dates are negative. This method usually pivots around the two century midpoint with the year numbers increasing on either side of the pivot point. If the pivot point is moved from the midpoint between the two centuries, then the unconverted year-date data can easily span parts of three different centuries. This allows a method according to a preferred embodiment of the present invention to process year-date data with a time span of 199 years between year-date extremes (i.e., the two-digit date representations 99, 89, 10, −1, −29, and −99=2027, 2017, 1938, 1927, 1899, and 1829, respectively).

Forecasting and Regression Analysis

Forecasting models present some areas of special concern for working with two-digit date fields and many computer systems. While forecasting modules may be found in any application software, forecasting is especially prevalent in billing, inventory, financial modeling, and other financial analysis applications. Software applications or modules that perform forecasting or projecting will need special attention when implementing the present invention.

As mentioned earlier, part of calculating the offset period for the present invention involves determining the date that is the furthest in the future for the computer system, whether that date is a date stored in a database file or a date as calculated by the application program. After the present invention has been implemented, all forecasting applications or modules must be checked for "indirect coded-in date references." This means that any of the formulas which use coefficients to generate forecasting or projections will need to be recalculated for the new date scheme. This usually only applies to applications or modules that have specific coefficients "hard-coded" into the software. This does not usually apply to models that re-calculate the coefficients "on the fly."

The reason for this situation is that many forecasting models use date-determined regression analysis techniques to determine the coefficients for the forecasting models. This means that the programs were developed using specific dates that are no longer valid when using the present invention. Some forecasting models contain subroutines which actually use the existing data to recalculate the coefficients. If this is not the case for a specific computer system, the coefficients may need to be recalculated by hand.

Religious Holiday Calculations

Software applications that calculate religious holidays "on the fly" may not work correctly when using the present invention. Any holiday which depends on the location of a celestial body will be computed incorrectly. Most modern software applications do not use celestial body algorithms to determine religious holidays because these algorithms are relatively CPU-intensive. Instead, most software applications calculate the dates for various religious holidays using look-up tables.

Payroll application programs and programs dealing with employee benefits also typically use holiday date calculations. In addition, different businesses may use other applications which rely on holiday dates for various reasons. All application programs which rely on holiday dates for processing data must be identified so that the date calculation portion can be modified, if necessary.

If the present invention is installed on a computer system that calculates holiday dates "on the fly," a software bridge must be added to the input date algorithm. As before, this bridge will add 28 years to the year-date data. Depending on the algorithm's output, another bridge may be required to subtract 28 years from the calculated holiday date. Generally, these algorithms only output a month and a year. Alternatively, the required holiday dates can simply be obtained from a look-up table to ensure accurate calculation of the necessary holiday dates.

The present invention is designed to work with the Gregorian Calendar and will not function correctly for software applications which use the Lunar Calendar to calculate holidays and other dates. However, this should not be a problem because, since 1948, every industrialized country in the world has adopted the Gregorian Calendar for use in calculating dates. There are still a few religious organizations and other entities that use other types of calendars but all significant business and military applications currently use the Gregorian Calendar. This makes the methods of the present invention applicable for almost all computer systems in use today. Therefore, it is anticipated that by using the methods of the present invention, the well-known problems associated with processing year-date data in computer systems can be avoided.

Specific Example

Referring now to FIGS. 1, 2, 4, 7, 8 and 9, one specific example of a preferred embodiment of the present invention can be used to handle the date-related information for a life insurance company. In this example, n=1 and N=28. The first step (reference step from FIG. 2) is to convert the data in database 119. Some of the year-date data contained in database 119 is represented with two-digit year-date data representations and some of the year-date data is represented with four-digit year-date data representations. For example, database 119 has three separate records containing the following two-digit year-date representations: 95 for the year 1895; 64 for the year 1964; and 04 for the year 2004. Database 119 also has three separate records containing the following four-digit year-date data representations: 1897, 1978, and 2003.

Using the logic flow represented in FIG. 7, the dates will be converted for use within encapsulated system 110. Since the year-date representation 95 could represent either 1895 or 1995, there is a century overlap and there must be some external methodology used to determine the correct century. In this case, it is assumed that the record number for these specific records allows the individual records to each be identified with their respective century.

For two-digit year-date data representations in the $19^{th}$ century, the data in database 119 is converted by adding (100−N) to the two-digit year-date data representation contained in database 119. In this case, 1895 is converted to −33 (95−100−28). For two-digit year-date data representations in the $20^{th}$ century, the data is converted by subtracting N from the two-digit year-date data representation contained in database 119. In this case, 1995 is converted to 67 (95−28). In a similar fashion, if any dates had an overlap into the $21^{st}$ century, those dates would be converted by adding (100−N) to the two-digit year-date data representation stored in database 119. Since there is no century overlap for the two-digit year-date data representation for the 2004 date, it can be converted using the procedure shown in FIG. 8. In this case, the result is 76 (04−28+100=76). This accounts for converting the two-digit year-date data representations contained in database 119.

Once again, following the logic depicted in FIG. 7, the four-digit year date data representations contained in database 119 will be converted using FIG. 9. Using the logic of FIG. 9, the year 1987 is converted to −31 (1897−1900−28= 31). Similarly, 1978 is converted to 50 (1978−1900−28=50) and 2003 is converted to 75 (2003−1900−28=75).

Next, data terminal 120 inputs a two-digit year-date data representation of 97 to represent the year 1997. Using the procedure shown in FIG. 3, 97 is converted for use within encapsulated system 110. Since 97 is greater than N, 97 is converted to 69 (97−28). The next date, 2002, is input as a two-digit year-date data representation 02. Since this two-digit year-date data representation is less than N, it is converted to 74 (04+100−28).

System clock 114 has been set back by the offset period N years (28) and therefore, the internal year date is 1969 and is represented within encapsulated system 110 as a two-digit year-date data representation, 69. Although the current year-date is stored within the system as a two-digit year-date data representation, it may be output to system 100 as either a two-digit or four-digit year-date data representation. When this date is to be passed out to data terminals 120, it is converted using the procedure shown in FIG. 6. In this case, since the current year is to be displayed in a two-digit format, N is added to the internal representation to achieve a result of 97 (69+28=97).

At this point in time, encapsulated system 110 has eight two-digit dates stored and available for processing. It should be noted that although this example is manipulating only the year-dates, other, non-date-related information is also typically associated with each record. As part of the normal processing that application 118 performs, it must sort these years in ascending order, from earliest year to the year furthest in the future. In this case, the sorted results would be as follows: −33, −31, 50, 67, 69, 74, 75, and 76. When these dates are to be output from encapsulated system 110, they are once again converted according to the procedure shown in FIG. 6. The resulting four-digit year-date representations for the output years are 1895, 1897, 1978, 1995, 1997, 2002, 2003, and 2004.

While the invention has been particularly shown and described with reference to preferred embodiments thereof, it will be understood by those skilled in the art that various changes in form and details may be made therein without departing from the spirit and scope of the invention.

I claim:

1. An apparatus for processing year-date data in a computer system, the apparatus comprising:
    a CPU;
    a bus coupled to the CPU;
    a memory coupled to the bus;
    a system clock coupled to the bus, wherein the system clock is set to an offset time wherein the offset time is a time other than the actual time;
    at least one application program stored in the memory and being executed by the CPU;
    a least one database file stored in the memory containing records with year-date data with years being represented by at least one of two-digit, three-digit, or four-digit year-date data representations; and
    a mechanism for converting the year-date data in the database file to a two-digit year-date data representation wherein each of the converted two-digit year-date data representations can include both positive and negative numbers which represent a 199-year span including dates from up to three centuries and wherein the converted two-digit year-date data representations are processed by the at least one application program without changing the at least one application program.

2. The apparatus of claim 1 wherein the offset time is the actual time minus a multiple of 28 years.

3. The apparatus of claim 1 wherein the offset time is the actual time plus a multiple of 28 years.

4. A method for processing year-date data in a computer system, the computer system having a computer system clock, the method comprising the steps of:
    setting the computer system clock to an offset time, the offset time being a time other than the actual time;

converting the year-date data representations contained in a database file so that all year-date data representations are represented by two-digit year-date data representations wherein each of the converted two-digit year-date data representations can include both positive and negative numbers which represent a 199-year span including dates from up to three centuries; and processing the converted two-digit year-date data representations using an application program without altering the application program.

5. The method of claim 4 further comprising the step of storing the converted two-digit year-date data representations in the database file.

6. The method of claim 4 wherein the step of setting the computer system clock to an offset time comprises setting the computer system clock to the actual time plus a multiple of 28 years.

7. The method of claim 4 wherein the step of setting the computer system clock to an offset time comprises setting the computer system clock to the actual time minus a multiple of 28 years.

8. The method of claim 7 further comprising the step of converting each of the processed two-digit year-date data representations into a four-digit year-date data representation by using a data conversion mechanism which adds a multiple of 28 years to the processed two-digit year-date data representations.

9. The method of claim 8 further comprising the step of outputting the four-digit data representations to an output device.

10. A method for processing year-date data in a computer system, the computer system having a computer system clock, the method comprising the steps of:

converting any four-digit year-date data representation stored in a database to a two-digit year-date data representation using a first data-conversion mechanism wherein each of the converted year-date representations can include both positive and negative numbers which represent a 199-year span including dates from up to three centuries;

converting any three-digit year-date data stored in a database to a two-digit year-date representation using a second data-conversion mechanism wherein each of the converted year-date representations can include both positive and negative numbers which represent a 199-year span including dates from up to three centuries;

converting any two-digit year-date data representation stored in a database to a two-digit year-date data representation using a third data-conversion mechanism wherein each of the converted year-date representations can include both positive and negative numbers which represent a 199-year span including dates from up to three centuries;

setting the computer system clock to an offset time, the offset time being a time other than the actual time; and processing the converted two-digit year-date data representations in the database using an application program designed to process two-digit year-date data representations, wherein the application program is not altered.

11. The method of claim 10 wherein the step of setting the computer system clock to an offset time comprises setting the computer system clock to the actual time minus a multiple of 28 years.

12. The method of claim 11 further comprising the step of converting the processed two-digit year-date data representation into a four-digit year-date data representation by using a fourth data-conversion mechanism which adds a multiple of 28 years to the processed two-digit year-date data representation.

13. The method of claim 12 further comprising the step of outputting the four-digit year-date data representations to an output device.

14. The method of claim 10 wherein the step of setting the computer system clock to an offset time comprises setting the computer system clock to the actual time plus a multiple of 28 years.

15. An apparatus for processing year-date data in a computer system, the apparatus comprising:

a CPU;

a bus coupled to the CPU;

a memory coupled to the bus;

a system clock coupled to the bus, wherein the system clock is set to an offset time wherein the offset time is a time other than the actual time;

at least one application program stored in the memory and being executed by the CPU;

a least one database containing records with year-date data with years being represented by at least one of two-digit, three-digit, or four-digit year-date representations;

a mechanism for converting any four-digit year-date representation stored in the at least one database to a two-digit year-date representation using a first algorithm wherein each of the converted year-date representations can include both positive and negative numbers which represent a 199-year span including dates from up to three centuries;

a mechanism for converting any three-digit year-date representation stored in the at least one database to a two-digit year-date representation using a second algorithm wherein each of the converted year-date representations can include both positive and negative numbers which represent a 199-year span including dates from up to three centuries; and a mechanism for converting any two-digit year-date representation stored in the at least one database to a two-digit year-date representation using a third algorithm wherein each of the converted year-date representations can include both positive and negative numbers which represent a 199-year span including dates from up to three centuries.

16. An apparatus for processing year-date data in a computer system, the apparatus comprising:

a CPU;

a bus coupled to the CPU;

a memory coupled to the bus;

a system clock coupled to the bus, wherein the system clock is set to an offset time wherein the offset time is a time other than the actual time;

at least one application program stored in the memory and being executed by the CPU;

a least one database file stored in the memory containing records with year-date data with years being represented by at least one of two-digit, three-digit, or four-digit year-date representations; and a mechanism for converting the year-date data representations in the database file to a two-digit year-date data representation.

* * * * *